US008181025B2

(12) United States Patent
Savagaonkar et al.

(10) Patent No.: US 8,181,025 B2
(45) Date of Patent: May 15, 2012

(54) METHOD AND APPARATUS FOR REGISTERING AGENTS ONTO A VIRTUAL MACHINE MONITOR

(75) Inventors: Uday Savagaonkar, Beaverton, OR (US); Ravi Sahita, Beaverton, OR (US); Prashant Dewan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1339 days.

(21) Appl. No.: 11/591,258

(22) Filed: Oct. 31, 2006

(65) Prior Publication Data
US 2008/0114985 A1 May 15, 2008

(51) Int. Cl.
*H04L 9/32* (2006.01)
*G06F 12/14* (2006.01)
*G06F 11/30* (2006.01)
*G06F 1/00* (2006.01)
*G06F 7/04* (2006.01)
*G06G 7/48* (2006.01)
*G06F 9/46* (2006.01)
*G06F 9/455* (2006.01)
*G06F 1/32* (2006.01)
*G06F 12/08* (2006.01)

(52) U.S. Cl. ......... 713/176; 713/189; 713/300; 726/17; 726/23; 726/26; 703/6

(58) Field of Classification Search .................. 713/176, 713/189, 300; 726/17, 26; 703/6
See application file for complete search history.

(56) References Cited

U.S. PATENT DOCUMENTS

| 2006/0004554 | A1* | 1/2006 | Vega et al. ................ 703/6 |
| 2007/0266265 | A1* | 11/2007 | Zmudzinski et al. ......... 713/300 |
| 2008/0022129 | A1* | 1/2008 | Durham et al. ............. 713/189 |
| 2008/0120499 | A1* | 5/2008 | Zimmer et al. ............ 726/17 |

FOREIGN PATENT DOCUMENTS
WO  WO 2007005924 A1 *  1/2007

OTHER PUBLICATIONS

Azab, A.M.; Peng Ning; Sezer, E.C.; Xiaolan Zhang; "HIMA: A Hypervisor-Based Integrity Measurement Agent"; Computer Security Applications Conference, 2009. ACSAC '09, Sep. 2009 , pp. 461-470.*

* cited by examiner

*Primary Examiner* — Matthew Smithers
*Assistant Examiner* — Courtney Fields
(74) *Attorney, Agent, or Firm* — L. Cho

(57) ABSTRACT

A method for managing an agent includes verifying an integrity of the agent in response to a registration request. Memory protection is provided for the agent during integrity verification. An indication is generated when registration of the agent has been completed. According to one aspect of the present invention, providing memory protection includes having a virtual machine monitor limit access to the agent. Other embodiments are described and claimed.

42 Claims, 8 Drawing Sheets

METHOD AND APPARATUS FOR REGISTERING AGENTS ONTO A VIRTUAL MACHINE MONITOR

FIELD

Embodiments of the present invention relate to security systems on a computer system. More specifically, embodiments of the present invention relate to methods and apparatus for registering agents onto a virtual machine monitor (VMM).

BACKGROUND

Virtualization is a technique in which a computer system is partitioned into multiple isolated virtual machines (VMs), each of which appears to the software within it to be a complete computer system. A conventional virtual machine manager (VMM) may run on a computer to present the abstraction of one or more VMs or guests to other software. Each VM may function as a self-contained platform that runs its own software stack, including an operating system (OS) and applications. Collectively this software stack is referred to as "guest software."

Recent worms and viruses are capable of breaching user/kernel boundaries which can compromise privileged software on the platform to malicious activities. A number of protection mechanisms are available to protect memory belonging to critical software agents. Some of these mechanisms partition a linear address space into protected and unprotected memory.

A verification procedure is typically used to verify the integrity of the agent in order to confirm that the agent requesting protection is one that should be granted protection. It is important that an agent in a VM not be allowed to run or modify its own local state until after its verification procedure is completed and protection is provided. One technique used to achieve this in the past was to lock down all hardware threads in a VM while verification was being performed in the VIM. This approach, however, adversely impacted the performance of other applications running in the VM. In addition, since the verification procedure could take a significant amount of time, an agent requesting protection could hold control of the operating system for a substantial amount of time.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
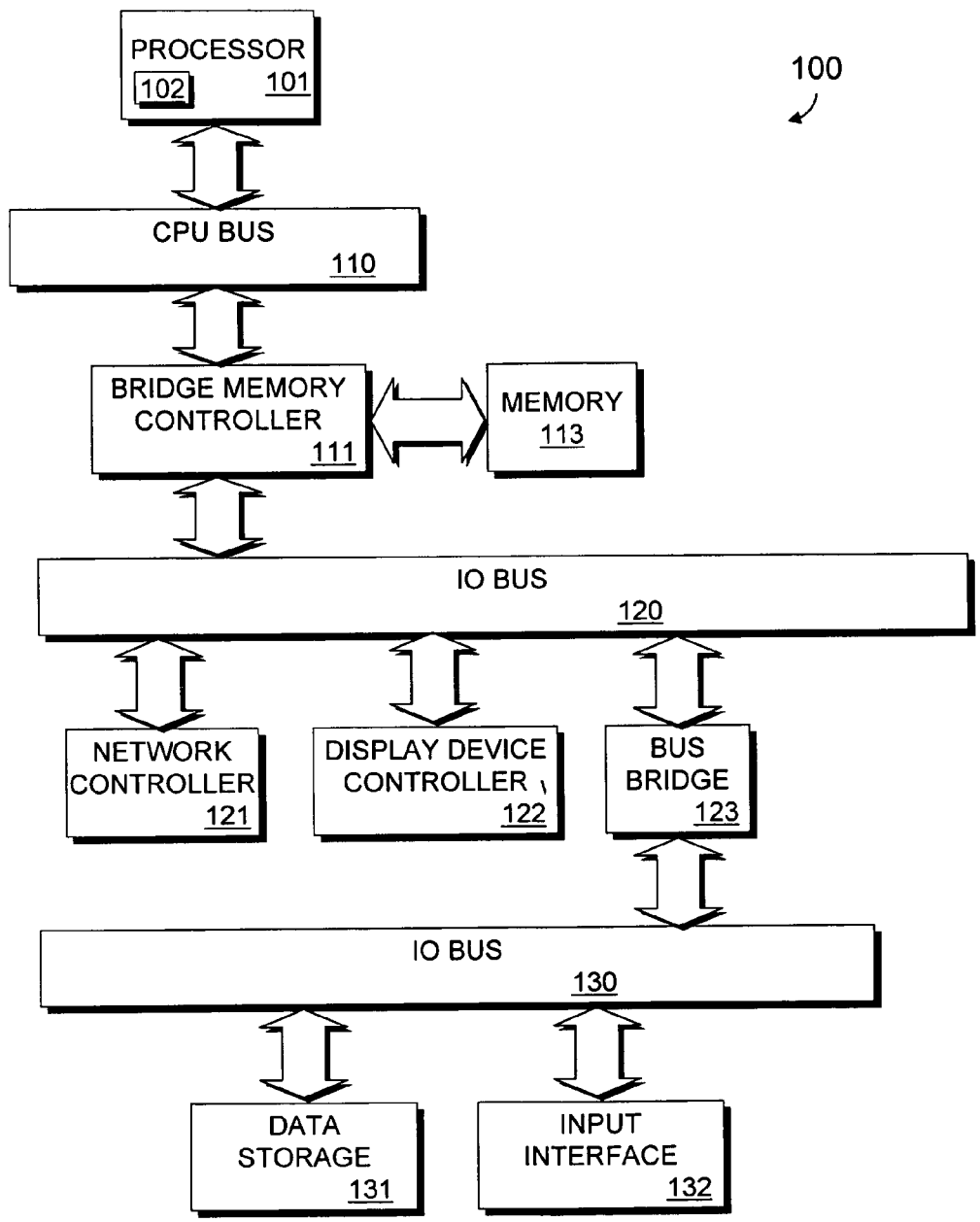
FIG. 1 illustrates an embodiment of a computer system according to an embodiment of the present invention.

FIG. 1 is a block diagram of a computer system 100 according to an exemplary embodiment of the present invention. The computer system 100 includes a processor 101 that processes data signals. The processor 101 may be a complex instruction set computer microprocessor, a reduced instruction set computing microprocessor, a very long instruction word microprocessor, a processor implementing a combination of instruction sets, or other processor device. FIG. 1 shows the computer system 100 with a single processor. However, it is understood that the computer system 100 may operate with multiple processors. Additionally, each of the one or more processors may support one or more hardware threads. The processor 101 is coupled to a CPU bus 110 that transmits data signals between processor 101 and other components in the computer system 100.

The computer system 100 includes a memory 113. The memory 113 may be a dynamic random access memory device, a static random access memory device, read-only memory, and/or other memory device. The memory 113 may store instructions and code represented by data signals that may be executed by the processor 101. A cache memory 102 may reside inside processor 101 that stores data signals stored in memory 113. The cache 102 speeds access to memory by the processor 101 by taking advantage of its locality of access. In an alternate embodiment of the computer system 100, the cache resides external to the processor 101. A bridge memory controller 111 is coupled to the CPU bus 110 and the memory 113. The bridge memory controller 111 directs data signals between the processor 101, the memory 113, and other components in the computer system 100 and bridges the data signals between the CPU bus 110, the memory 113, and IO bus 120.

The IO bus 120 may be a single bus or a combination of multiple buses. The IO bus 120 provides communication links between components in the computer system 100. A network controller 121 is coupled to the IO bus 120. The network controller 121 may link the computer system 100 to a network of computers (not shown) and supports communication among the machines. A display device controller 122 is coupled to the IO bus 120. The display device controller 122 allows coupling of a display device (not shown) to the computer system 100 and acts as an interface between the display device and the computer system 100. Alternatively, the display device controller 122 may be connected directly to bridge memory controller 111.

IO bus 130 may be a single bus or a combination of multiple buses. IO bus 130 provides communication links between components in the computer system 100. A data storage device 131 is coupled to the IO bus 130. The data storage device 131 may be a hard disk drive, a floppy disk drive, a CD-ROM device, a flash memory device or other mass storage device. An input interface 132 is coupled to the IO bus 130. The input interface 132 may be, for example, a keyboard and/or mouse controller or other input interface. The input interface 132 may be a dedicated device or can reside in another device such as a bus controller or other controller. The input interface 132 allows coupling of an input device to the computer system 100 and transmits data signals from an input device to the computer system 100. A bus bridge 123 couples IO bus 120 to IO bus 130. The bus bridge 123 operates to buffer and bridge data signals between IO bus 120 and IO bus 130.

According to an embodiment of the present invention, the processor 101 executes instructions stored in memory 113 that include virtualization software. The virtualization software supports virtualization on the computer system 100 and the usage of the memory 113 to execute applications (agents) run on virtual machines. An agent may seek protection from accesses made from other agents through a registration procedure provided by the virtualization software. The registration procedure verifies the integrity of the agent and offers temporary protection to the agent during the verification process.

Figure 2:
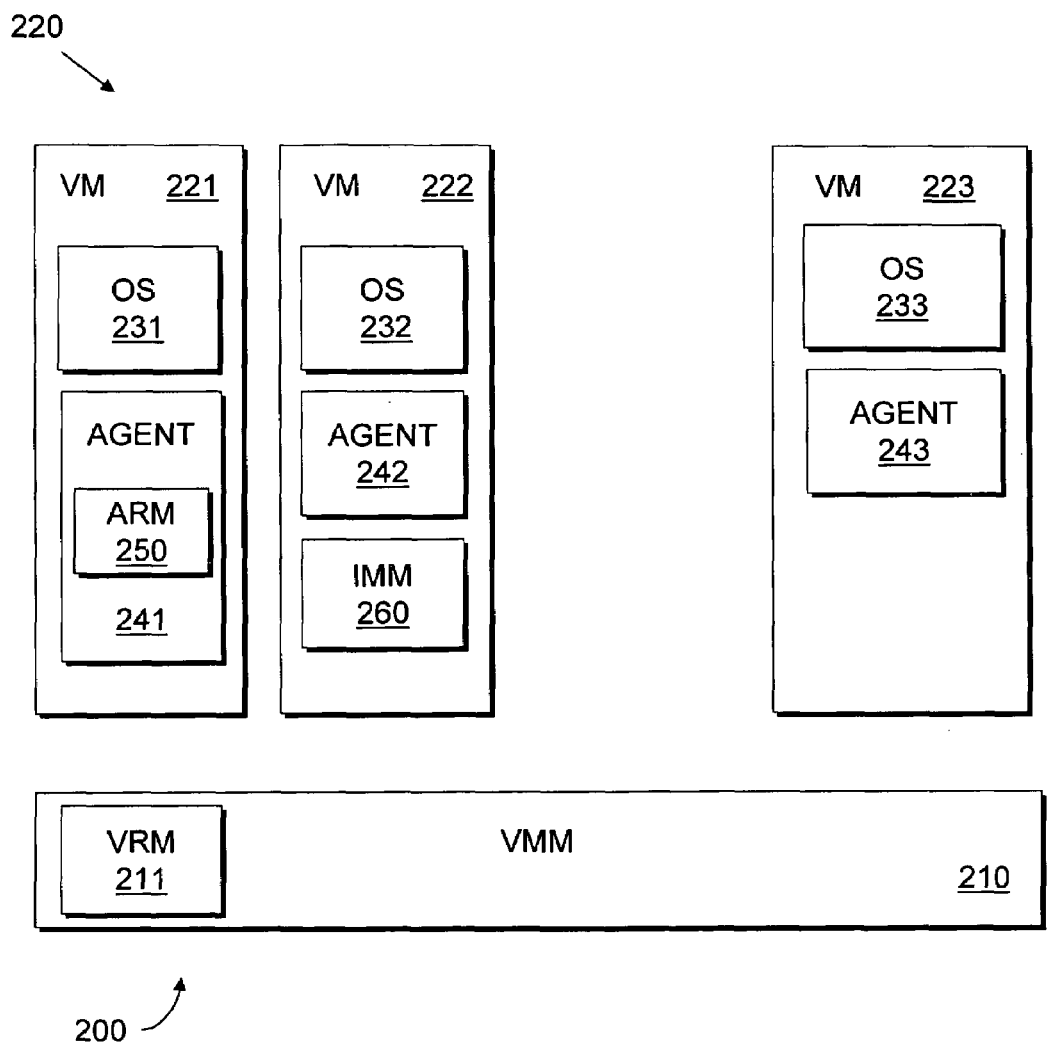
FIG. 2 is a block diagram that illustrates a virtualized environment in which an embodiment of the invention resides according to a first embodiment.

FIG. 2 is a block diagram that illustrates a virtualized environment 200 according to an exemplary embodiment of the present invention. The virtualized environment 200 includes a VMM 210. The VMM 210 interfaces a physical machine. The physical machine may include components of a computer system such as, for example, one or more processors, a memory, buses, a host controller, and various IO devices. According to an embodiment of the present invention, the physical machine may be implemented by the computer system 100 shown in FIG. 1 or a computer system having components similar to those shown in FIG. 1. The VMM 210 facilitates one or more VMs 220 to be run. According to an embodiment of the present invention, the VMM 210 may be a sequence of instructions stored in the memory of a computer system. The VMM 210 manages and mediates computer system resources in the physical machine between the VMs 220 and allows the isolation of or data sharing between VMs 220. The VMM 210 achieves this isolation or sharing by virtualizing resources in the physical machine and exporting a virtual hardware interface (i.e., a VM) that could reflect an underlying architecture of the physical machine, a variant of the physical machine, or an entirely different physical machine.

The virtualized environment 200 includes one or more VMs 221-223 (collectively shown as 220). According to an embodiment of the present invention, a VM may be described as an isolated model of a machine including, but not limited to, a replica of the physical machine, a subset of the physical machine, or model of an entirely different machine. A VM may include the resources of the computer system in the physical machine, a subset of the resources of the computer system in the physical machine, or entirely virtual resources not found in the physical machine.

According to an embodiment of the present invention, the VMM 210 has control of the physical machine and creates VMs 220, each of which behaves like a physical machine that can run its own operating system (OS). VMs 221-223 may run operating systems (guest operating systems) 231-233 respectively where the operating systems 231-233 may be unique to one another. To maximize performance, the VMM 210 allows a VM to execute directly on the resources of the computer system in the physical machine when possible. The VMM 210 may take control, however, whenever a VM attempts to perform an operation that may affect the operation of other VMs, the VMM 210 or of the operation of resources in the physical machine. The VMM 210 may emulate the operation and may return control to the VM when the operation is completed.

One or more agents (guest applications) may be run on each of the VMs 221-223. Agent 241 is shown to be run on VM 221. Agent 242 is shown to be run on VM 222. Agent 243 is shown to be run on VM 223. Agent 241 may be an application that requires protection from malicious attacks from other agents in the virtualized environment 200. The agent 241 includes an agent registration module (ARM) 250. The ARM 250 makes a request to the VMM 210 to register agent 241 so that it may be protected. The ARM 250 puts the agent 241 in a sleep mode for a predetermined period of time. By putting the agent in a sleep mode, control of a processor is returned back to an operating system. After expiration of the predetermined period of time, the ARM 250 determines whether the registration procedure is completed for the agent 241.

The VMM 210 includes a VMM registration module (VRM) 211. The VRM 211 provides temporary protection for the agent 241. According to an embodiment of the VMM 210, the VRM 211 provides temporary protection for the agent by limiting access to the agent by restricting access to page table entries of the agent 241. The VRM 211 also effectuates the registration of agent 241 and provides a notification to the agent regarding the status of the registration.

The VMM 210 includes an integrity measurement module 260. The integrity measurement module (IMM) 260 receives a request to register the agent 241 from the VMM 210. The IMM 260 examines a manifest of the agent 241 to confirm the authenticity of the manifest. Upon confirming the authenticity of the manifest, the IMM 260 also confirms the authenticity of the current state of the agent 241 using information from the manifest. Upon confirming the authenticity of the current state of the agent 241, the VMM 210 may provide permanent protection to the agent 241 according to specifications in the manifest. The IMM 260 is shown to reside in VM 222 in FIG. 2. It should be appreciated that the IMM 260 may reside in other components of the virtualized environment 200 computer system. For example, the IMM 260 may reside in another VM such as VM 223 or in the VMM 210. Alternatively, the IMM 260 may reside in a peripheral or input out device on the computer system 100 such as bus bridge 123 (shown in FIG. 1).

Figure 3:
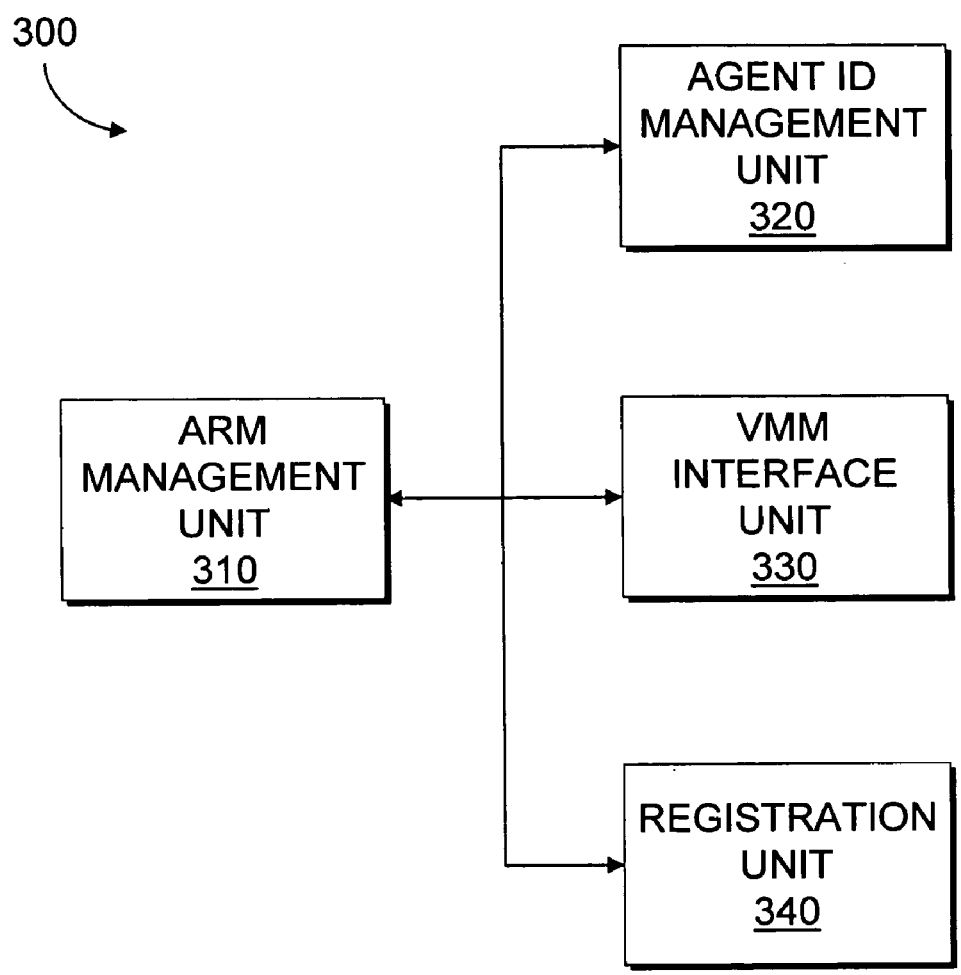
FIG. 3 is a block diagram of an agent registration module according to an exemplary embodiment of the present invention.

FIG. 3 is a block diagram of an ARM 300 according to an exemplary embodiment of the present invention. The ARM 300 may be implemented as the ARM 250 shown in FIG. 2. The ARM 300 includes an ARM management unit 310. The ARM management unit 310 is coupled to and transmits information between components in the ARM 300.

The ARM 300 includes an agent identifier (ID) management unit 320. The agent identifier management unit 320 initializes an agent identifier for its corresponding agent. The agent identifier includes an agent number and a registration flag to indicate whether the agent has been registered. The agent identifier may also include an integrity flag to indicate whether the agent has successfully passed integrity verification. It should be appreciated that each of the flags may be implemented by one or more binary numbers. According to an embodiment of the agent identifier management unit 320, the agent number is initialized to zero, and the registration flag is set to indicate that the agent has not been registered.

The ARM 300 includes a VMM interface unit 330. The VMM interface unit 330 communicates with a VMM to inform the VMM that the agent requires protection by requesting registration. According to an embodiment of the ARM 300, the VMM interface unit 330 makes a registration call to the VMM. The VMM interface unit 330 also communicates with the VMM to determine the status of the registration process. According to an embodiment of the ARM 300, the VMM interface unit 330 puts the agent to sleep for a predetermined period of time after a last check on the status of the registration process. After the period of time has expired, the ARM 300 re-checks the status of the registration process. According to an embodiment of the ARM 300, the VMM interface unit 330 enables interrupts before putting the agent to sleep and disable interrupts after the agent has awaken from its sleep.

The ARM 300 includes a registration status unit 340. The registration status unit 340 receives the current agent identifier for the agent from the VMM. The registration status unit 340 reads the agent identifier to determine whether the registration flag is set. The registration flag indicates whether the agent has been registered. The registration status unit 340 also reads the agent identifier to determine whether the integrity flag is set. If the agent has been registered and has passed integrity verification, the ARM 300 allows the agent to be executed.

Figure 4:
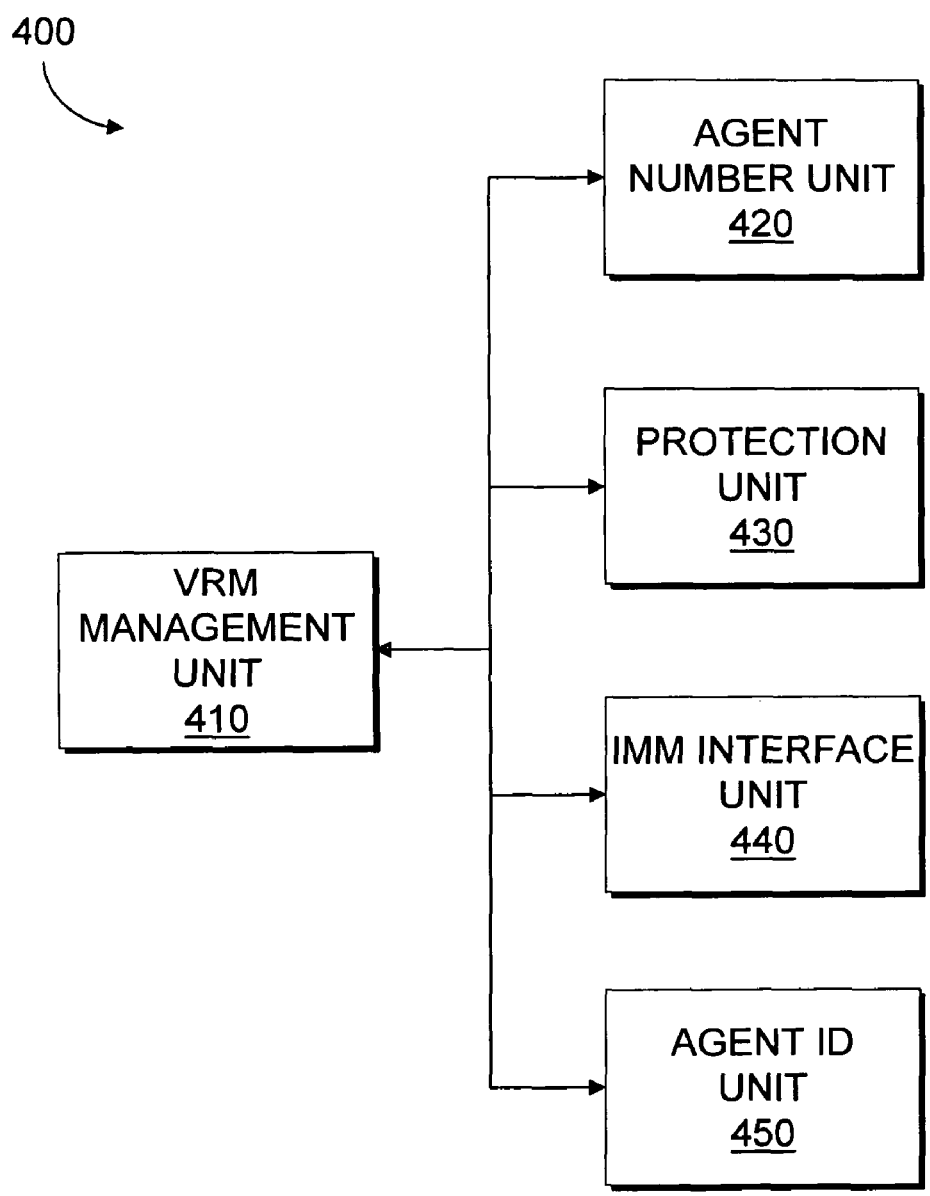
FIG. 4 is a block diagram of a VMM registration module according to an exemplary embodiment of the present invention.

FIG. 4 is a block diagram of a VRM 400 according to an exemplary embodiment of the present invention. The VRM 400 includes a VRM management unit 410. The VRM management unit 410 is coupled to and transmits information between components in the VRM 400.

The VRM 400 includes an agent number unit 420. The agent number unit 420 assigns a new, non-zero agent number to each agent requesting registration for the first time. According to an embodiment of the VRM 400, the agent number unit 420 determines whether an agent is making a registration call for the first time. The agent number unit 420 may make this determination by reading the agent's number. If the agent's number is zero, it is determined that the agent is making the registration call for the first time.

The VRM 400 includes a protection unit 430. The protection unit 430 provides temporary protection for agents during the registration process. When the temporary protection is in place, all static and dynamic entry points into the agent are disabled. According to an embodiment of the present invention, a single entry point is left exposed after interrupts are disabled by an ARM. The protection unit 430 may provide temporary protection for agents by having a VMM limit access to the agent. This may be achieved by restricting access to page table entries of the agent. For example, page table entries corresponding to the agent may be marked as not present or execute disabled. A read or write request to the page table entry would result in a page fault. It should be appreciated that other techniques may be used to provide temporary protection for agents during the registration process. The protection unit 430 may provide permanent protection for an agent after the agent has completed the registration process and has successfully passed integrity verification. The permanent protection may include instructions specified by a manifest of the agent. It should be appreciated that the permanent protection may differ or may be the same as the temporary protection.

The VRM 400 includes an IMM interface unit 440. The IMM interface unit 440 forwards requests from agents to register to an IMM. The IMM interface unit 440 receives information from the IMM regarding whether integrity verification for the agent is completed and whether the agent has successfully passed integrity verification.

The VRM 400 includes an agent identifier unit 450. The agent identifier unit 450 updates the agent identifier with any new agent number received from the agent number unit 420. The agent identifier unit 450 also updates the registration flag and integrity flag in the agent identifier to reflect the status of registration and integrity verification.

Figure 5:
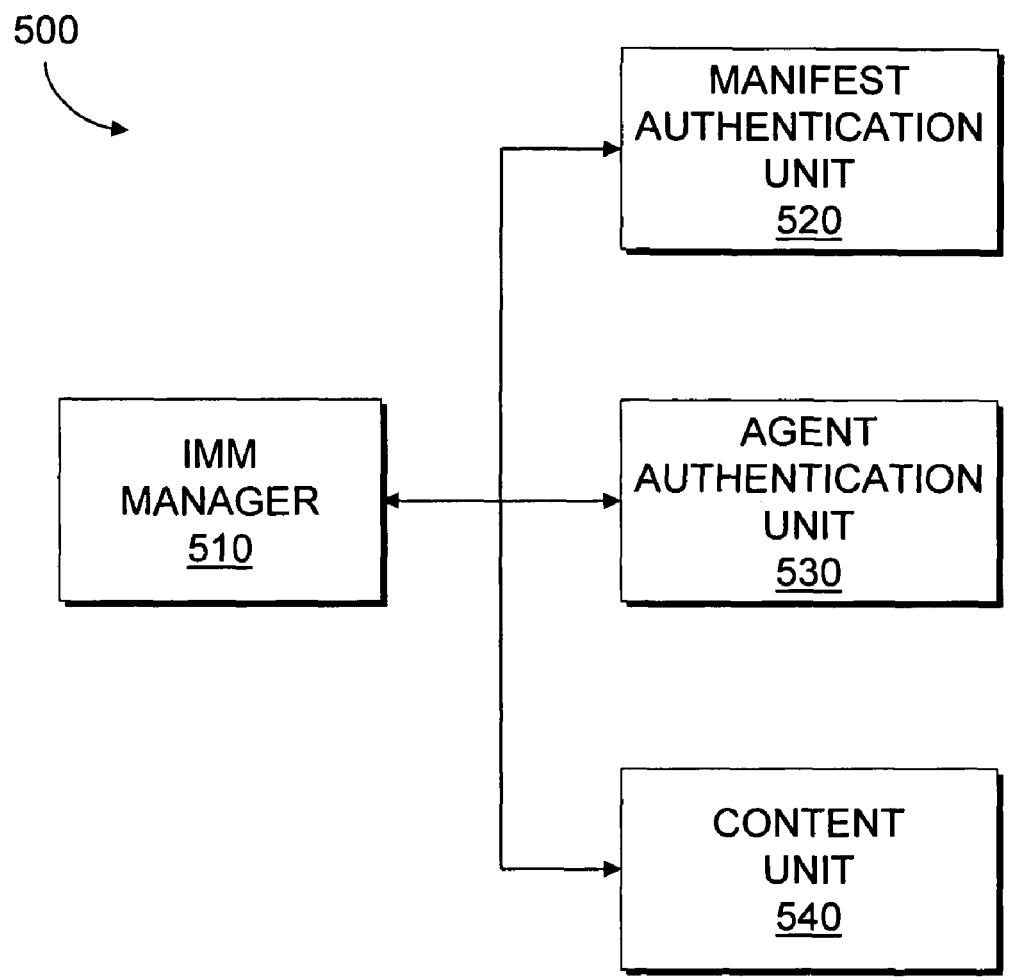
FIG. 5 is a block diagram an integrity measurement module according to an exemplary embodiment of the present invention.

FIG. 5 is a block diagram of an integrity measurement module 500 according to an exemplary embodiment of the present invention. The integrity measurement module 500 may be used to implement the integrity measurement module 212 shown in FIG. 2. The IMM 500 includes an IMM manager 510. The IMM manager 510 is coupled to and transmits information between components in the IMM 500.

The IMM 500 includes a manifest authentication unit 520. The manifest authentication unit 520 verifies the authenticity of a manifest associated with an agent. According to an embodiment of IMM 500, the manifest may be cryptographically signed. In this embodiment, the manifest authentication unit 520 attempts to verify the signed manifest using a public key which the manifest authentication unit 520 trusts.

The IMM 500 includes an agent authentication unit 530. The agent authentication unit 530 compares parameters of the agent with parameters of the agent specified in the manifest. According to an embodiment of the IMM 500, the comparison of the parameters may be achieved by verifying an image of the agent loaded to memory against an image of the agent in the manifest. If the comparison confirms that the agent has the parameters specified in the manifest, the agent passes the integrity authentication.

The IMM 500 includes a content unit 540. In an embodiment of the present invention where the manifest includes additional information to be used by a VRM, the content unit 540 forwards the information to the appropriate component. For example, if specifications regarding how an agent is to be permanently protected is in a signed manifest, the content unit 540 may forward the specification to a protection unit on the VRM.

Embodiments of the present invention provide a secure system which returns control to an agent after receiving a registration request while preventing the agent from executing before integrity verification is complete. Embodiments of the secure system prevent race condition attacks that would exist if the agent were allowed to run in parallel while integrity verification is being performed. The secure system does not require locking down all threads in a VM while the agent in the VM is undergoing integrity verification. This provides the VM with performance benefits.

According to an embodiment of the present invention, to provide protection against spoofing, the completion of integrity verification is communicated to the agent via a memory location in a protected memory area of the agent. Since the entry points exposed by the manifest should not trusted before integrity verification is complete, the static entry points into the agent are not exposed to the operating system while integrity verification is still pending. After integrity verification is complete, the VMM may enable all static entry points in the agent.

Figure 6:
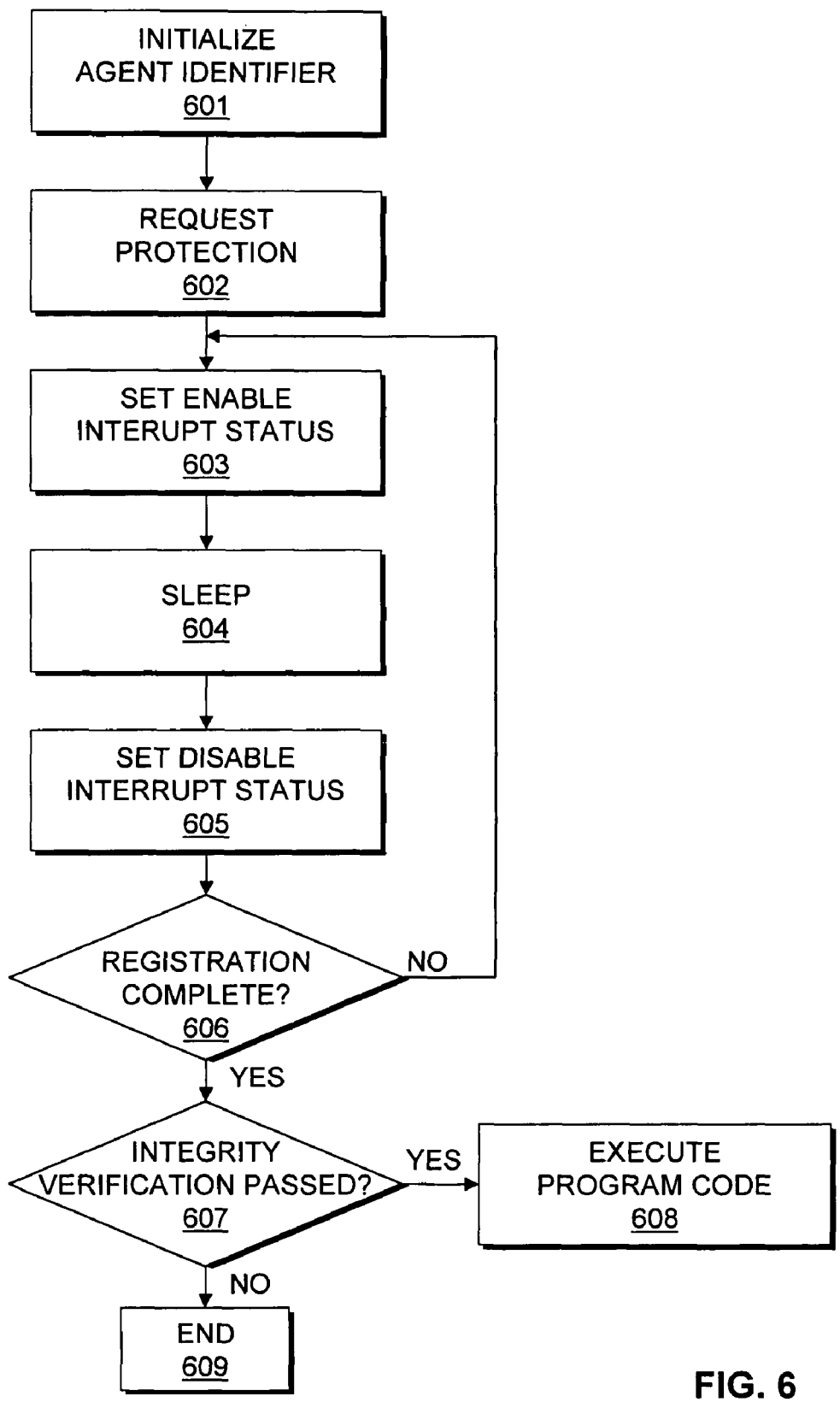
FIG. 6 is a flow chart illustrating a method for managing an agent according to an exemplary embodiment of the present invention.

FIG. 6 is a flow chart illustrating a method for managing an agent according to an exemplary embodiment of the present invention. The procedures illustrated in FIG. 6 may be performed by the ARM 300 shown in FIG. 3. At 601, an agent identifier for an agent is initialized. According to an embodiment of the present invention, an agent identifier includes an agent number and a registration flag to indicate whether the agent has been registered. It should be appreciated that the flag may be implemented by one or more binary numbers. The agent identifier may also include an integrity flag to indicate whether the agent has successfully passed integrity verification. According to an embodiment of the agent number is initialized to zero, the registration flag is set to indicate that the agent has not been registered, and the integrity flag is set to indicate that it has not passed integrity verification.

At 602, a request is made for protection. According to an embodiment of the present invention, a request is made to protect the memory used by the agent. The request may be in the form of a registration call to a VMM.

At 603, interrupts are enabled. According to an embodiment of the present invention, enabling interrupts allow an operating system to attend to other tasks.

At 604, the agent is put to sleep for a predetermined period of time. According to an embodiment of the present invention, an operating system may be prompted to put an agent to sleep.

At 605, interrupts are disabled. According to an embodiment of the present invention, disabling interrupts prevents race condition attacks.

At 606, it is determined whether registration of the agent is complete. According to an embodiment of the present invention, the status of the registration request may be checked by examining the most recent agent identifier of the agent. The registration flag in the agent identifier indicates whether the agent has been registered. If it is determined that registration is complete, control returns to 603. If it is determined that registration is not complete, control proceeds to 607.

At 607, it is determined whether the agent passed integrity verification. According to an embodiment of the present invention, the status of integrity verification may be checked by examining the most recent agent identifier of the agent. The integrity flag in the agent identifier indicates whether the agent has passed integrity verification. If it is determined that the agent passed integrity verification, control proceeds to 608. If it is determined that the agent has not passed integrity verification, control proceeds to 609.

At 608, the program code of the agent is allowed to be executed.

At 609, control terminates the procedure.

Figure 7:
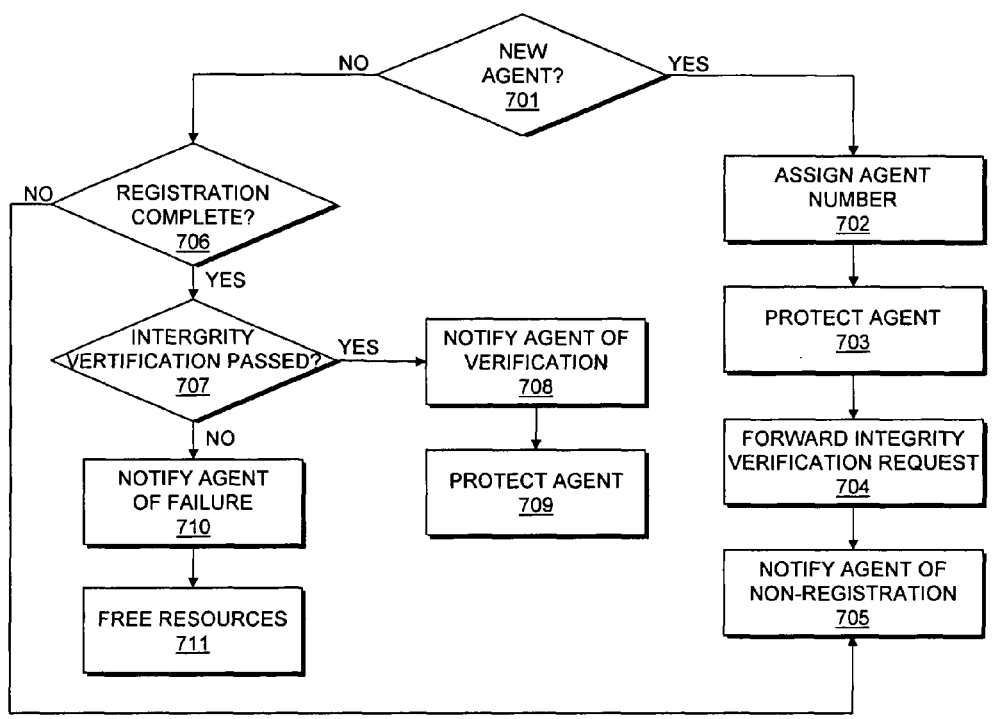
FIG. 7 is a flow chart illustrating a method for registering an agent according to an exemplary embodiment of the present invention.

FIG. 7 is a flow chart illustrating a method for registering an agent according to an exemplary embodiment of the present invention. The procedures illustrated in FIG. 7 may be performed by the VMM registration module 400 shown in FIG. 4. At 701, it is determined whether an agent is a new agent (making a registration call for the first time). According to an embodiment of the present invention, this determination can be made by examining an agent's number. If the agent's number is zero, it is determined that the agent is making the registration call for the first time. If it is determined that the agent is a new agent control proceeds to 702. If it is determined that the agent is not a new agent, control proceeds to 706.

At 702, a new agent number is assigned to the agent. According to an embodiment of the present invention, a new, unique, non-zero agent number is assigned to each agent requesting registration for the first time.

At 703, protection is provided to the agent. According to an embodiment of the present invention, temporary protection is provided for agents during the registration process. When the temporary protection is in place, all static and dynamic entry points into the agent are disabled with the exception of one. According to an embodiment of the present invention, the single entry point left exposed may be after interrupts are disabled by an ARM. The temporary protection for agents includes having a VMM limit access to the agent. This may be achieved by restricting access to page table entries of the agent. It should be appreciated that other techniques may be used to provide temporary protection for agents during the registration process.

At 704, the registration request is forwarded to an IMM. According to an embodiment of the present invention, forwarding the registration request may involve forwarding a request to perform integrity verification on the agent.

At 705, the agent is notified of non-registration. During the time when registration is pending, the agent may be notified of non-registration by setting a registration flag in the agent identifier and returning the agent identifier to the agent.

At 706, it is determined whether registration is complete. According to an embodiment of the present invention, this determination may be made by communicating with the IMM. If it is determined that registration has been completed, control proceeds to 707. If it is determined that integrity verification has not been completed, control returns to 705.

At 707, it is determined whether integrity verification has been passed. According to an embodiment of the present invention, this determination may be made by communicating with the IMM. If it is determined that the agent has passed integrity verification, control proceeds to 708. If it is determined that the agent has not passed integrity verification, control proceeds to 710.

At 708, a notification is generated and forwarded to the agent. According to an embodiment of the present invention, the notification may be provided by setting the registration flag to indicate that registration is completed and by setting the verification flag to indicate that integrity verification has been passed.

At 709, protection is provided to the agent. According to an embodiment of the present invention, permanent protection for the agent is provided that may include instructions specified by a manifest of the agent.

At 710, a notification is generated and forwarded to the agent. According to an embodiment of the present invention, the notification may be provided by setting the registration flag to indicate that registration is completed and by setting the verification flag to indicate that integrity verification has not been passed.

At 711, resources utilized by the agent are freed. According to an embodiment of the present invention, memory used by the agent may be freed for use by other applications. It should be appreciated that after an agent is notified of non-registration, control may return to 706.

Figure 8:
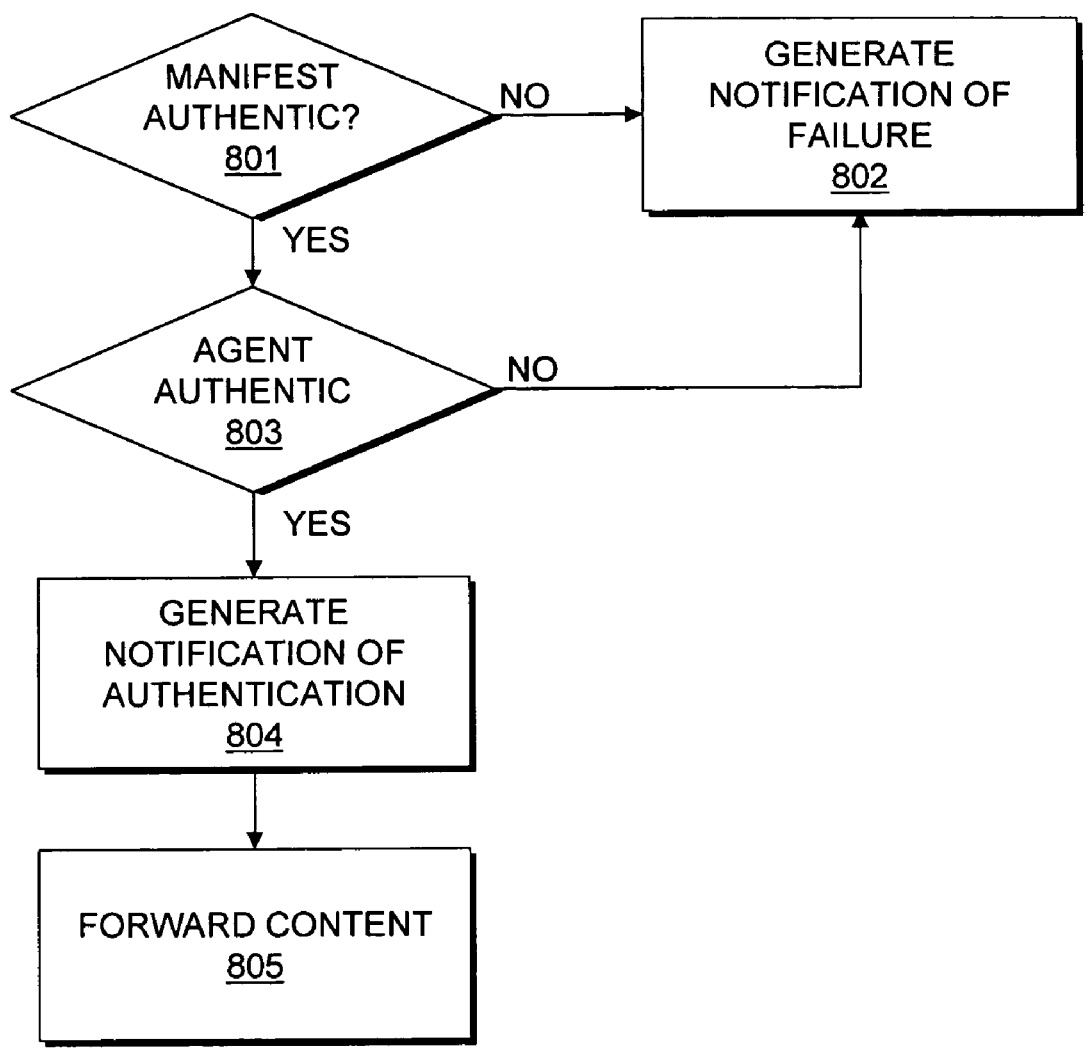
FIG. 8 is a flow chart illustrating a method for performing integrity verification according to an exemplary embodiment of the present invention.

FIG. 8 is a flow chart illustrating a method for performing integrity verification according to an exemplary embodiment of the present invention. The procedures illustrated in FIG. 8 may be performed by the IMM 500 shown in FIG. 5. At 801, it is determined whether a manifest of an agent is authentic. According to an embodiment of the present invention, the manifest may be cryptographically signed. In this embodiment, attempts to decrypt the signed manifest may be made by using a public key which is trusted. It should be appreciated that other procedures and techniques may be used to authenticate the manifest. If it is determined that the manifest is not authentic, control proceeds to 802. If it is determined that the manifest is authentic, control proceeds to 803.

At 802, a notification is generated that the agent has failed integrity verification. The notification may be transmitted to a VRM on a VMM.

At 803, it is determined whether the agent is authentic. According to an embodiment of the present invention, parameters of the agent are compared with parameters of the agent specified in the manifest. For example, comparison of the parameters may be achieved by verifying an image of the agent loaded to memory against an image of the agent in the manifest. If the comparison confirms that the agent has the parameters specified in the manifest, the agent passes the integrity authentication. If it is determined that the agent is not authentic, control proceeds to 802. If it is determined that the agent is authentic, control proceeds to 804.

At 804, a notification is generated that the agent has passed integrity verification. The notification may be transmitted to the VRM on the VMM.

At 805, encrypted content stored in the manifest that may be used by a VRM is forwarded to the appropriate component. It should be appreciated that in an embodiment of the invention where the manifest is not encrypted, the procedure at 805 may not be practiced.

FIGS. 6 through 8 are flow charts illustrating methods according to embodiments of the present invention. Some of the techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for managing an agent, comprising:
   verifying an integrity of the agent in response to a registration request;
   providing memory protection for the agent during integrity verification, wherein the memory protection is a temporary protection; and
   indicating that registration of the agent has been completed, wherein at least one of the verifying, providing, and indicating procedures is performed by a hardware processor.

2. The method of claim 1, wherein providing memory protection for the agent comprises having a virtual machine monitor limit access to the agent.

3. The method of claim 1, wherein providing memory protection for the agent comprises restricting access to page table entries of the agent.

4. The method of claim 1, wherein verifying the integrity of the agent comprises authenticating a manifest of the agent.

5. The method of claim 1, wherein verifying the integrity of the agent comprises authenticating a manifest of the agent by authenticating a signature of the manifest.

6. The method of claim 1, wherein verifying the of the agent comprises:
   authenticating a manifest of the agent; and
   comparing properties of the agent with properties of the agent as specified in the manifest.

7. The method of claim 1, wherein the temporary protection comprises disabling all entry points advertised by the agent via a manifest.

8. The method of claim 1, wherein providing memory protection comprises exposing a single entry point after a sleep statement.

9. The method of claim 1, further comprising providing permanent protection to the agent in response to determining that the integrity of the agent has been verified, wherein the temporary protection differs from the permanent protection.

10. The method of claim 1, further comprising indicating that the registration of the agent has been completed by setting a flag in an agent identifier.

11. The method of claim 1, further comprising indicating that registration of the agent has not been completed.

12. The method of claim 1, further comprising indicating that registration of the agent has not been completed by setting a flag in an agent identifier.

13. The method of claim 1, further comprising indicating that the agent has failed integrity verification.

14. The method of claim 1, further comprising assigning an agent number to the agent in an agent identifier.

15. A method for managing an agent, comprising:
   verifying an integrity of the agent in response to a registration request;
   providing memory protection for the agent during integrity verification;
   indicating that registration of the agent has been completed;
   putting the agent in a sleep mode for a predetermined period of time; and
   checking a registration status of the agent upon expiration of the period of time, wherein at least one of the verifying, providing, indicating, putting, and checking procedures is performed by a hardware processor.

16. The method of claim 1, further comprising:
   enabling interrupts;
   putting the agent in a sleep mode for a predetermined period of time;
   disabling interrupts; and
   checking a registration status of the agent upon expiration of the period of time.

17. The method of claim 1, further comprising providing permanent memory protection to the agent according to specification in a manifest upon verifying the integrity of the agent.

18. A computer system, comprising:
   an integrity measurement manager (IMM) to verify an integrity of an agent in response to a registration request;

a virtual machine monitor registration module (VRM) to provide protection for the agent dining integrity verification, wherein the IMM and VRM are implemented by a hardware processor; and an agent registration module (ARM) to put the agent to sleep for a predetermined period of time, and to check on a registration status of the agent after the predetermined period of time expires.

19. The computer system of claim 18, wherein the VRM comprises an agent identifier unit to indicate a status of registration to the agent by setting a flag in an agent identifier.

20. The computer system of claim 18, wherein the IMM comprises:
   a manifest authentication unit to authenticate a signature on the manifest; and
   an agent authentication unit to compare properties of the agent with properties of the agent specified on the manifest.

21. The method of claim 1, wherein the agent is run on a virtual machine (VM).

22. The method of claim 1, wherein the agent is run on a virtual machine (VM) and the agent is not a virtual machine monitor (VMM).

23. The computer system of claim 18, wherein the IMM resides outside an operating system in a virtual machine.

24. A non-transitory computer readable medium including a sequence of instructions stored thereon for causing a computer to execute a method, comprising:
   verifying an integrity of an agent in response to a registration request;
   providing memory protection for the agent during integrity verification, wherein the memory protection is a temporary protection; and
   indicating that registration of the agent has been completed.

25. The non-transitory computer readable of claim 24, wherein providing memory protection for the agent comprises having a virtual machine monitor limit access to the agent.

26. The non-transitory computer readable medium of claim 24, wherein providing memory protection for the agent comprises restricting access to page table entries of the agent.

27. The non-transitory computer readable medium of claim 24, wherein verifying the integrity of the agent comprises authenticating a manifest of the agent.

28. The non-transitory computer readable medium of claim 24, wherein verifying the integrity of the agent comprises authenticating a manifest of the agent by authenticating a signature of the manifest.

29. The non-transitory computer readable medium of claim 24, wherein verifying the of the agent comprises:
   authenticating a manifest of the agent; and
   comparing properties of the agent with properties of the agent as specified in the manifest.

30. The non-transitory computer readable medium of claim 24, wherein the temporary protection comprises disabling all entry points advertised by the agent via a manifest.

31. The non-transitory computer readable medium of claim 24, wherein providing memory protection comprises exposing a single entry point after a sleep statement.

32. The non-transitory computer readable medium of claim 24, further comprising providing permanent protection to the agent in response to determining that the integrity of the agent has been verified, wherein the temporary protection differs from the permanent protections.

33. The non-transitory computer readable medium of claim 24, further comprising indicating that the registration of the agent has been completed by setting a flag in an agent identifier.

34. The non-transitory computer readable medium of claim 24, further comprising indicating that registration of the agent has not been completed.

35. The non-transitory computer readable medium of claim 24, further comprising indicating that registration of the agent has not been completed by setting a flag in an agent identifier.

36. The non-transitory computer readable medium of claim 24, further comprising indicating that the agent has failed integrity verification.

37. The non-transitory computer readable medium of claim 24, further comprising assigning an agent number to the agent in an agent identifier.

38. A computer system, comprising:
   an integrity measurement manager (IMM) to verify an integrity of an agent in response to a registration request; and
   a virtual machine monitor registration module (VRM) to provide memory protection for the agent during integrity verification, wherein the memory protection is a temporary protection; and
   an indication unit to indicate when registration of the agent is complete, wherein the IMM and VRM are implemented by a hardware processor.

39. The computer system of claim 38, wherein the VRM comprises an agent identifier unit to indicate a status of registration o the agent by setting a flag in an agent identifier.

40. The computer system of claim 38, wherein the IMM comprises:
   a manifest authentication unit to authenticate a signature on the manifest; and
   an agent authentication unit to compare properties of the agent with properties of the agent specified on the manifest.

41. The computer system of claim 38, further comprising an agent registration module (ARM) to put the agent to sleep for a predetermined period of time, and to check on a registration status of the agent after the predetermined period of time expires.

42. The computer system of claim 38, wherein the IMM resides outside an operating system in a virtual machine.

* * * * *